(12) United States Patent
Takamoto et al.

(10) Patent No.: US 7,829,609 B2
(45) Date of Patent: Nov. 9, 2010

(54) COMPOSITION, ARTICLE AND THEIR PRODUCTION METHOD, AND FILM AND ITS PRODUCTION METHOD

(75) Inventors: Tetsufumi Takamoto, Kanagawa (JP); Takahiro Ishizuka, Kanagawa (JP); Shohei Kataoka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 286 days.

(21) Appl. No.: 12/180,164

(22) Filed: Jul. 25, 2008

(65) Prior Publication Data

US 2009/0029169 A1 Jan. 29, 2009

(30) Foreign Application Priority Data

Jul. 27, 2007 (JP) .............................. 2007-195485

(51) Int. Cl.
*C08K 9/00* (2006.01)
(52) U.S. Cl. ...................... 523/200; 523/210; 523/204
(58) Field of Classification Search ................. 523/200, 523/201, 204
See application file for complete search history.

(56) References Cited

FOREIGN PATENT DOCUMENTS

| EP | 1 582 551 | A1 | 10/2005 |
| EP | 1582551 | A1 * | 10/2005 |
| JP | 2005-060680 | A | 3/2005 |
| JP | 2005060680 | A * | 3/2005 |

* cited by examiner

Primary Examiner—Kelechi C Egwin
(74) Attorney, Agent, or Firm—Sughrue Mion, PLLC

(57) ABSTRACT

A composition comprising an organic crystal having a minor axis length of from 3 to 100 nm and a major axis length of from 10 to 2,000 nm and a matrix material, wherein the organic crystal satisfies that (1) a surfactant is adsorbed on the organic crystal, (2) an inorganic ion is adsorbed on the organic crystal, (3) silicon oxide, titanium oxide, aluminum oxide, zirconium oxide, barium oxide or hydroxyapatite is bonded with the organic crystal, or (4) the organic crystal is modified with a group represented by the following formula (1):

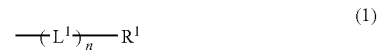

(1)

wherein $L^1$ represents —O—, —S—, —CO— or others, n is 0 to 4, and $R^1$ represents an organic group.

19 Claims, No Drawings

COMPOSITION, ARTICLE AND THEIR PRODUCTION METHOD, AND FILM AND ITS PRODUCTION METHOD

BACKGROUND OF THE INVENTION

1. Field of the Invention

The present invention relates to a composition containing an organic crystal and a matrix material. Also, the invention relates to an article and a film each of which is to be produced using the same. Furthermore, the invention relates to a method for producing the article and film.

2. Description of the Related Art

Resin materials have characteristics that they are lightweight and cheap and are easily molded, and therefore, they are utilized in a variety of applications and become one of absolutely indispensable materials in the modern society. However, in general, the resin materials have inferior performances such that they are low in heat resistance, large in coefficient of thermal expansion, small in stiffness and small in impact resistance as compared with inorganic materials and metallic materials.

For that reason, hybridization of the resin material with other material is carried out as a measure for enhancing those performances. In hybrid materials containing a resin as a matrix, a hybrid material with a glass fiber is general. Also, a material using a cellulose fiber produced by a bacterium (bacterial cellulose) as a reinforcing fiber is also developed (see, for example, JP-A-2005-60680).

The foregoing material having a resin matrix hybridized with a glass fiber involves problems that the transparency is hindered and that the moldability is lowered. On the other hand, the foregoing bacterial cellulose fiber-reinforced hybrid material hardly generates scattering of visible light and has transparency due to the matter that the width of the cellulose fiber is thoroughly small as compared with the visible light. Also, it is successful to make the thermal expansion of the hybrid material small due to the matter that the cellulose fiber has low thermal expansion properties. However, since the cellulose fiber has a three-dimensionally entangled structure, there is a restriction that the resin which can be used as the matrix is limited to a liquid hardening resin. Also, because of the matter that the hybrid material composed of a cellulose fiber and a matrix resin is insoluble and non-melting and does not have moldability, the hybrid material involves a problem that it does not have processability.

SUMMARY OF THE INVENTION

Then, in order to solve the foregoing problems of the related art, the present inventors have set up an object of the invention so as to provide a hybrid material which even when a wide-ranging matrix material is used, mixing can be achieved and which is excellent in transparency and low thermal expansion properties.

The present inventors made extensive and intensive investigations. As a result, it has been found that when an organic crystal which meets a specified requirement is used, mixing with a wide-ranging matrix material can be achieved and that a hybrid material having excellent transparency and low thermal expansion properties can be produced. That is, the following invention has been accomplished as means for solving the problems.

(1) A composition comprising an organic crystal having a minor axis length of from 3 to 100 nm and a major axis length of from 10 to 2,000 nm and a matrix material, the organic crystal meeting at least one of the following requirements that (1) a surfactant is adsorbed thereon; that (2) an inorganic ion is adsorbed thereon; that (3) one or more inorganic compounds selected from the group consisting of silicon oxide, titanium oxide, aluminum oxide, zirconium oxide, barium oxide and hydroxyapatite are bonded therewith; and that (4) it is modified with a group represented by the following formula (1):

in the formula (1), $L^1$ represents a connecting group represented by any one of the following formulae (2) to (21); n represents an integer of from 0 to 4; when n represents an integer of from 2 to 4, $L^1$s in the number of n may be the same or different; and $R^1$ represents an organic group,

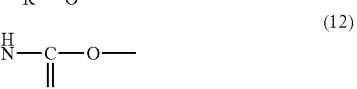

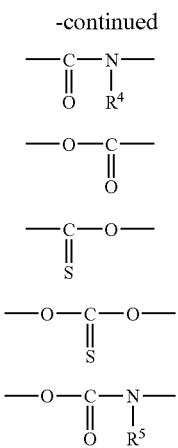

R² in the formula (11), R³ in the formula (13), R⁴ in the formula (17) and R⁵ in the formula (21) each independently represents an organic group.

(2) The composition as set forth in (1), wherein the surfactant is a cationic surfactant.
(3) The composition as set forth in (1) or (2), wherein the organic crystal is modified with at least one group selected from the group consisting of an alkyl group, an acyl group, an acylamino group, a cyano group, an alkoxy group, an aryl group, an amino group, an aryloxy group and a silyl group.
(4) The composition as set forth in any one of (1) to (3), wherein the organic crystal is an organic polymer crystal.
(5) The composition as set forth in any one of (1) to (4), wherein the organic crystal does not substantially contain a sulfate group.
(6) The composition as set forth in any one of (1) to (5), wherein the organic crystal is crystalline cellulose.
(7) The composition as set forth in any one of (1) to (6), wherein the matrix material is a resin.
(8) The composition as set forth in (7), wherein the resin is a thermoplastic resin, a solvent-soluble resin or a hardening resin.
(9) The composition as set forth in (7), wherein the resin is a thermoplastic resin, a solvent-soluble resin or a mixture thereof.
(10) The composition as set forth in (7), wherein the resin is a hardening resin.
(11) The composition as set forth in (7), wherein the organic crystal is crystalline cellulose, and the resin is a cellulose based resin.
(12) The composition as set forth in (7), wherein the organic crystal is crystalline cellulose, and the resin is an aliphatic polyester resin.
(13) An article comprising the composition as set forth in any one of (1) to (12).
(14) A method for producing an article comprising molding the composition as set forth in any one of (1) to (12) by injection molding, extrusion molding, compression molding, blow molding or powder molding.
(15) A film comprising the composition as set forth in any one of (1) to (12).
(16) A method for producing a film comprising subjecting the composition as set forth in any one of (1) to (12) to a solution casting film formation method.
(17) A method for producing a film comprising subjecting the composition as set forth in any one of (1) to (12) to a solventless film formation method.
(18) A method for producing a film comprising subjecting the composition as set forth in any one of (1) to (12) to a melt extrusion film formation method.
(19) The method for producing a film as set forth in (18), wherein the film formation is carried out by an inflation method.

In the composition of the invention, a wide-ranging matrix material can be used, and a variety of functions can be borne. For example, when a thermoplastic resin is chosen as the matrix material, a composition having processability can be provided. The article and film to be produced using the composition of the invention exhibit transparency and low thermal expansion properties. Also, by employing the production method of the invention, the article and film having such characteristics can be simply produced.

BEST MODE FOR CARRYING OUT THE INVENTION

The composition of the invention and the article and film using the same are here under described in detail. The following description of the constitutional requirements is made on the basis of representative embodiments of the invention, but it should not be construed that the invention is limited to those embodiments. In this specification, numerical value ranges expressed by the term "to" mean that the numerical values described before and after it are included as a lower limit and an upper limit, respectively.

[Organic Crystal]

(Type)

The composition of the invention contains an organic crystal.

Though the type of the organic crystal to be used in the invention is not particularly limited, it is preferable that the organic crystal to be used in the invention is modified with at least one group selected from the group consisting of an alkyl group, an acyl group, an acylamino group, a cyano group, an alkoxy group, an aryl group, an amino group, an aryloxy group and a silyl group. Furthermore, the organic crystal to be used in the invention is preferably an organic polymer crystal. This is because the heat resistance is enhanced because of an organic polymer. Examples of the organic polymer crystal include cellulose, polyethylene, polypropylene, polyaramid, polybenzoxazole, liquid crystal polymers, polyethylene terephthalate, polyethylene naphthalate and poly(p-oxybenzoyl). Of these, cellulose, liquid crystal polymers and poly(p-oxybenzoyl) are preferable, with cellulose being especially preferable. Crystalline cellulose can be obtained from a vegetable material derived from woods, bamboos, kenafs, hemps, etc.; a material produced by bacteria such as acetic acid bacter; a material produced by marine organisms such as an ascidian; or the like.

(Minor Axis Length and Long Axis Length)

In the organic crystal to be used in the invention, its minor axis length is from 3 to 100 nm, preferably from 3 to 50 nm, and more preferably from 3 to 30 nm. An organic crystal having a minor axis length of less than 3 nm is poor in handling properties; and an organic crystal having a minor axis length exceeding 100 nm is a cause to hinder the transparency due to scattering of visible light. Also, in the organic crystal to be used in the invention, its major axis length is from 10 to 2,000 nm, preferably from 50 to 1,500 nm, and more preferably from 100 to 1,000 nm. When the major axis length of the organic crystal is less than 10 nm, the shape becomes close to a sphere so that a hybridization effect with the matrix is lowered; and when the major axis length of the organic crystal exceeds 2,000 nm, the mixing properties are lowered. When the major axis length is not more than 2,000 nm, mixing with the matrix becomes easy, thereby bringing an advantage that the range of the type of the matrix which can be used is widened.

A method for obtaining an organic crystal having a minor axis length of from 3 to 100 nm and a major axis length of from 10 to 2,000 nm is not particularly limited. For example, such an organic crystal can be obtained by a method for hydrolyzing cellulose with high crystallinity, for example, bacterial cellulose, commercially available microcrystalline cellulose, with a mineral acid or a method for macerating and dispersing cellulose by a high-pressure homogenizer.

(Requirement 1)

In the composition of the invention, an organic crystal having a surfactant adsorbed thereon can be favorably used. When the surfactant is adsorbed, the dispersibility into the matrix is enhanced, and coagulation is suppressed, whereby there are brought an effect for enhancing the transparency and an effect for enhancing an elastic modulus. The type of the surfactant to be used herein is not particularly limited, and any of anionic, cationic and nonionic surfactants may be used. Above all, it is preferable to use a cationic surfactant.

Examples of the cationic surfactant include an ammonium ion, a phosphonium ion, a pyridinium ion, an imidazolium ion and a quinuclidinium ion. From the viewpoint of heat resistance, a phosphonium ion and a quinuclidinium ion are preferable. Examples of the anionic surfactant include a sulfate ion, a sulfonate ion and a carboxylate ion. Of these, a sulfonate ion is preferable. Examples of the nonionic surfactant include a polymer containing polyethylene glycol in a principal chain thereof.

The surfactant may be of a low-molecular weight type or a high-molecular weight type. The "low-molecular weight type" as referred to herein refers to one having a molecular weight of 15 or more and less than 2,000, and one having a molecular weight of from 100 to 1,000 is preferable. Also, the "high-molecular weight type" as referred to herein refers to one having a molecular weight of from 2,000 to 1,000,000, and one having a molecular weight of from 5,000 to 500,000 is preferable.

As the surfactant to be used in the invention, those having an alkyl group (preferably one having from 1 to 36 carbon atoms, and more preferably one having from 1 to 24 carbon atoms), an aryl group (preferably one having from 6 to 40 carbon atoms, and more preferably one having from 6 to 30 carbon atoms), an alkaryl group (preferably one having from 7 to 30 carbon atoms, and more preferably one having from 7 to 15 carbon atoms), an aralkyl group (preferably one having from 7 to 20 carbon atoms, and more preferably one having from 7 to 12 carbon atoms), a heteroaryl group (preferably one having from 5 to 40 carbon atoms, and more preferably one having from 5 to 30 carbon atoms) or a cycloalkyl group (preferably one having from 5 to 20 carbon atoms, and more preferably one having from 5 to 15 carbon atoms) are preferable.

Specific examples of the surfactant which can be used in the invention are hereunder given below, but it should not be construed that the surfactant which can be used in the invention is limited thereto.

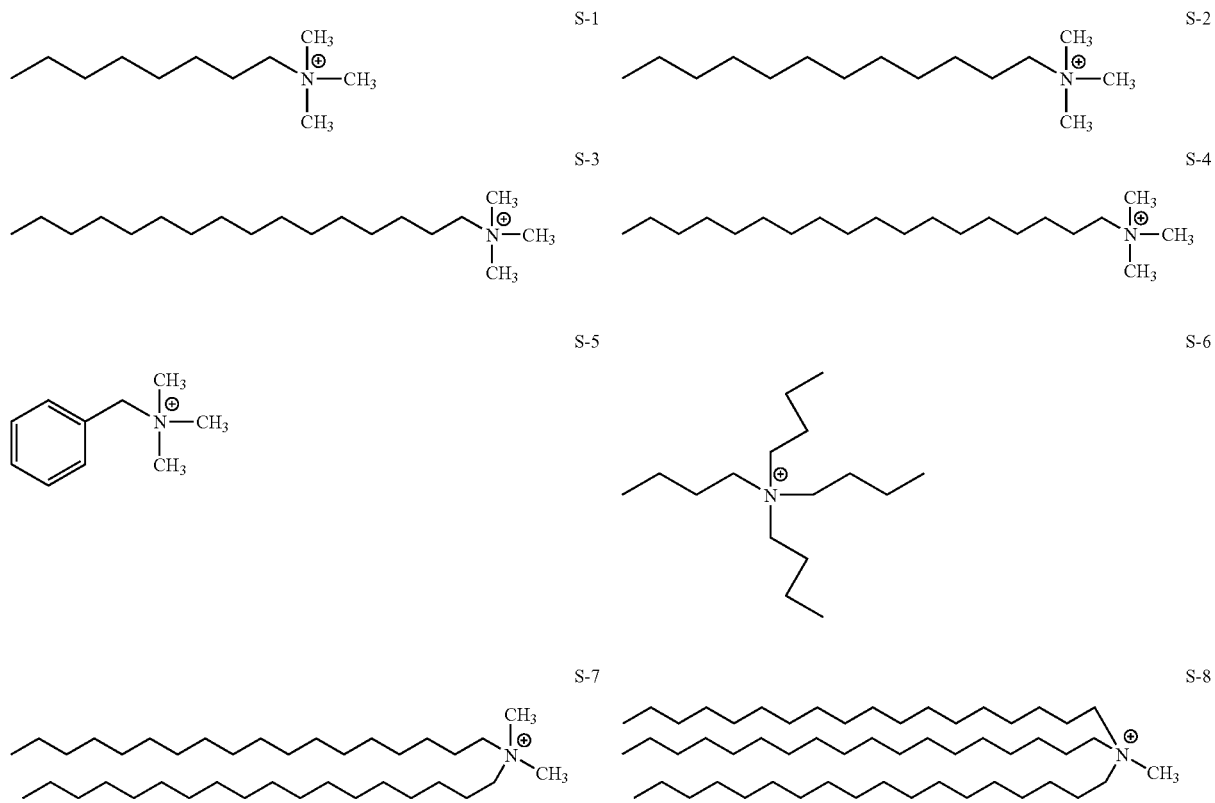

-continued
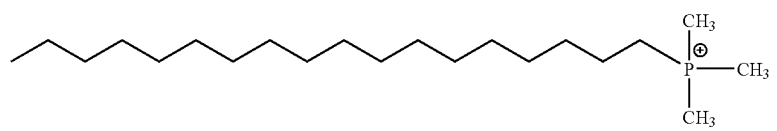
S-9
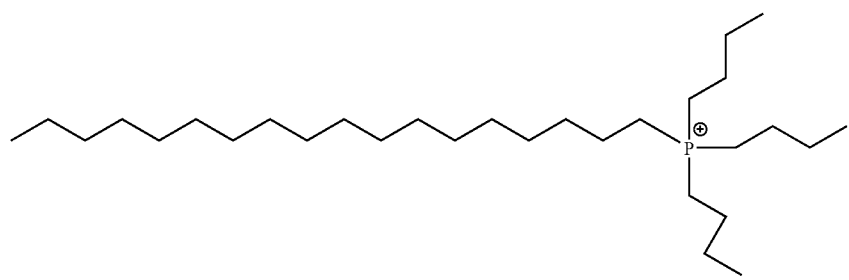
S-10
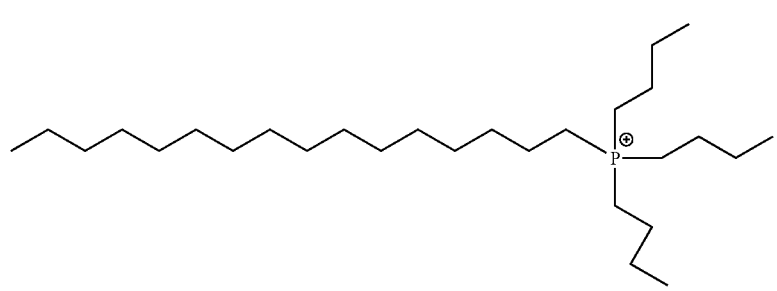
S-11
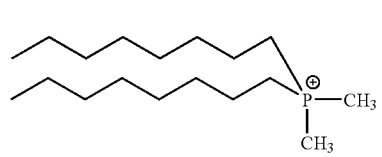
S-12
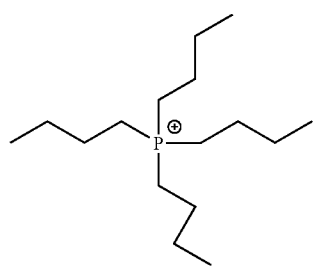
S-13
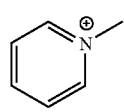
S-14
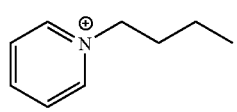
S-15
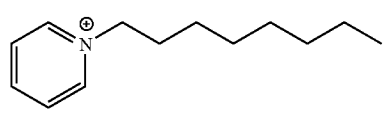
S-16
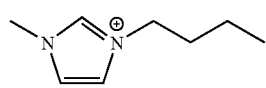
S-17
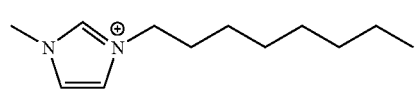
S-18
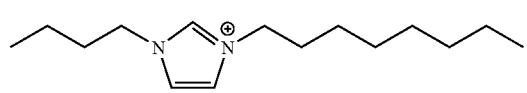
S-19
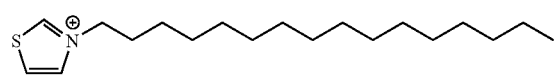
S-20
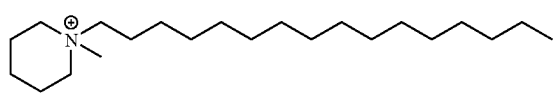
S-21

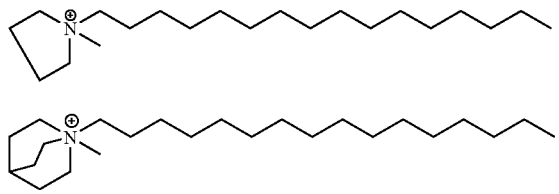

S-22

S-23

S-24

The adsorption amount of the surfactant is usually from 1 to 100 parts by mass, preferably from 1 to 50 parts by mass, and more preferably from 1 to 20 parts by mass based on 100 parts by mass of the organic crystal. The adsorption of the surfactant on the organic crystal can be carried out by any one of usually employed methods. A method for dispersing the organic crystal in a solvent and adding the surfactant, thereby adsorbing the surfactant thereon is preferable.

(Requirement 2)

In the composition of the invention, an organic crystal having an inorganic ion adsorbed thereon can be favorably used. When the inorganic ion is adsorbed, the heat decomposition temperature is enhanced, whereby the heat resistant temperature can be enhanced. By enhancing the heat resistant temperature, there is brought an advantage that in melt mixing with a thermoplastic resin, the composition can be used by raising the temperature to a high temperature.

Examples of the inorganic ion to be used for the adsorption include a calcium ion, a magnesium ion, a sodium ion, a potassium ion, a lithium ion, an aluminum ion, a strontium ion, a barium ion, a radium ion, a copper ion, a silver ion, a gold ion, a zinc ion, a nickel ion and a cobalt ion. Of these, a calcium ion, a magnesium ion, a sodium ion, a potassium ion and a lithium ion are preferable.

The adsorption amount of the inorganic ion is usually from 0.00001 to 20 parts by mass, preferably from 0.0001 to 10 parts by mass, and more preferably from 0.0001 to 5 parts by mass based on 100 parts by mass of the organic crystal. The adsorption of the inorganic ion on the organic crystal can be carried out by any one of usually employed methods. A method for dispersing the organic crystal in a solvent and adding an inorganic salt, thereby adsorbing the inorganic ion thereon is preferable.

(Requirement 3)

In the composition of the invention, an organic crystal having a specified inorganic compound bonded therewith can be favorably used. The "specified inorganic compound" as referred to herein refers to one or more inorganic compounds selected from the group consisting of silicon oxide, titanium oxide, aluminum oxide, zirconium oxide, barium oxide and hydroxyapatite. When such an inorganic compound is bonded, the dispersibility in the matrix material is enhanced, thereby obtaining an effect for raising the heat decomposition temperature.

A proportion of the inorganic compound is usually from 0.0001 to 100 parts by mass, preferably from 0.0001 to 50 parts by mass, and more preferably from 0.0001 to 30 parts by mass based on 100 parts by mass of the organic crystal. The bonding of the inorganic compound with the organic crystal can be carried out by any one of usually employed methods. A method for dispersing the organic crystal in a solvent and adding a metal alkoxide, a silane coupling agent, etc., thereby bonding the inorganic compound therewith is preferable.

(Requirement 4)

In the composition of the invention, an organic crystal having a group represented by the foregoing formula (1) can be favorably used. When the organic group is bonded, there is brought the same effect as in the adsorption of a surfactant as described previously. That is, the dispersibility into the matrix is enhanced, and coagulation is suppressed, whereby there are brought an effect for enhancing the transparency and an effect for enhancing an elastic modulus.

In the formula (1), $L^1$ is a connecting group represented by any one of the foregoing formulae (2) to (21). Above all, from the viewpoint of easiness of the formation of a bond, $L^1$ is preferably a connecting group represented by any one of the formulae (2), (3), (4), (6), (7), (8), (10), (11), (15), (16), (17), (18) and (19), more preferably a connecting group represented by any one of the formulae (2), (3), (4), (6), (7), (8), (15), (16) and (18), and further preferably a connecting group represented by any one of the formulae (2), (4), (6), (7) and (15).

In the case where the organic crystal is crystalline cellulose, the group represented by the formula (1) can be introduced through the reaction with a hydroxyl group on the crystal surface. In that case, it is preferable that $L^1$ in the formula (1) is a connecting group represented by any one of the formulae (2), (4), (6), (7), (15) and (21).

In the formula (1), n represents an integer of from 0 to 4, preferably from 0 to 2, and more preferably from 1 to 2. When n represents an integer of from 2 to 4, $L^1$s in the number of n may be the same or different.

In the formula (1), $R^1$ represents an organic group. The molecular weight of the organic group may be not more than 1,000 or may exceed 1,000.

Examples of the organic group having a molecular weight of not more than 1,000 include an alkyl group (preferably one having from 1 to 36 carbon atoms, and more preferably one having from 1 to 18 carbon atoms, for example, a methyl group, an ethyl group, an isopropyl group, a tert-butyl group); an aryl group (preferably one having from 6 to 36 carbon atoms, and more preferably one having from 6 to 24 carbon atoms, for example, a phenyl group, a biphenyl group, a naphthyl group); an alkoxy group (preferably one having from 1 to 36 carbon atoms, and more preferably one having from 1 to 18 carbon atoms, for example, a methoxy group, an ethoxy group, an isopropoxy group); an acyl group (preferably one having from 2 to 36 carbon atoms, and more preferably one having from 2 to 18 carbon atoms, for example, an acetyl group, a propionyl group, a butyryl group); an acylamino group (preferably one having from 1 to 36 carbon atoms, and more preferably one having from 1 to 18 carbon atoms, for example, a formylamino group, an acetylamino group); an aryloxy group (preferably one having from 6 to 36 carbon atoms, and more preferably one having from 6 to 24 carbon atoms, for example, a phenoxy group); a cyano group;

and a silyl group (for example, a trimethylsilyl group, a triphenylsilyl group, a dimethylbutylsilyl group).

The organic group may have a substituent. Examples of the substituent include a halogen atom; an alkyl group (for example, a methyl group, an ethyl group, an isopropyl group, a tert-butyl group); an aryl group (preferably one having from 6 to 30 carbon atoms, and more preferably one having from 6 to 15 carbon atoms, for example, a phenyl group, a biphenyl group, a naphthyl group); an alkoxy group (preferably one having from 1 to 30 carbon atoms, and more preferably one having from 1 to 12 carbon atoms, for example, a methoxy group, an ethoxy group, an isopropoxy group); an acyl group (preferably one having from 2 to 36 carbon atoms, and more preferably one having from 2 to 18 carbon atoms, for example, an acetyl group, a propionyl group, a butyryl group); an acylamino group (preferably one having from 1 to 36 carbon atoms, and more preferably one having from 1 to 18 carbon atoms, for example, a formylamino group, an acetylamino group); an aryloxy group (preferably one having from 6 to 36 carbon atoms, and more preferably one having from 6 to 18 carbon atoms, for example, a phenoxy group); an acyloxy group (preferably one having from 2 to 36 carbon atoms, and more preferably one from 2 to 18 carbon atoms, for example, an acetyloxy group, a propionyloxy group, a butyryloxy group); a cyano group; a hydroxyl group; and a nitro group.

It is possible to use a polymer or an oligomer as the organic group having a molecular weight exceeding 1,000. The case where a polymer or an oligomer is bonded is favorable from the standpoint that the coagulation is suppressed due to steric repulsion in the matrix. The polymer or oligomer may have a substituent as exemplified previously.

Specific examples of the organic group which can be used in the invention are hereunder given below, but it should not be construed that the organic group which can be employed in the invention is limited thereto.

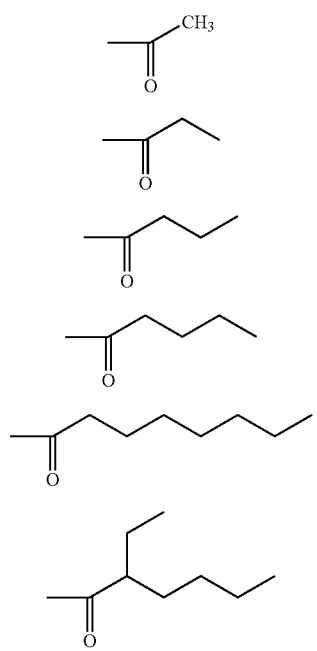

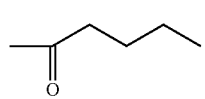
Z-1

Z-2

Z-3

Z-4

Z-5

Z-6

-continued

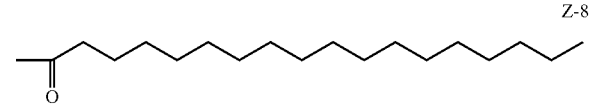
Z-7

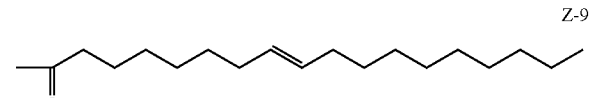
Z-8

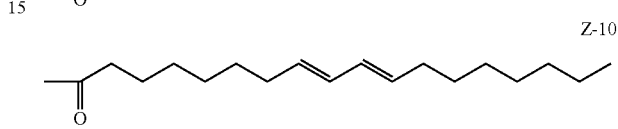
Z-9

Z-10

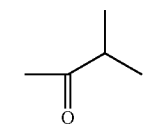
Z-11

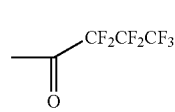
Z-12

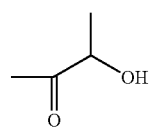
Z-13

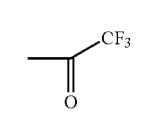
Z-14

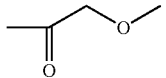
Z-15

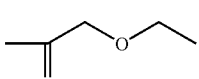
Z-16

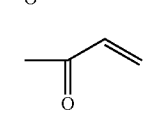
Z-17

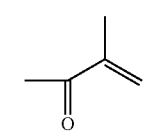
Z-18

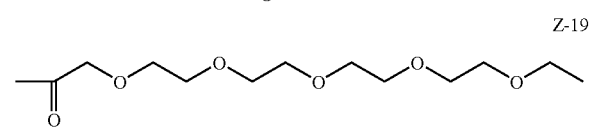
Z-19

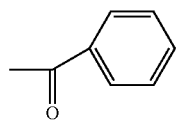
Z-20

-continued
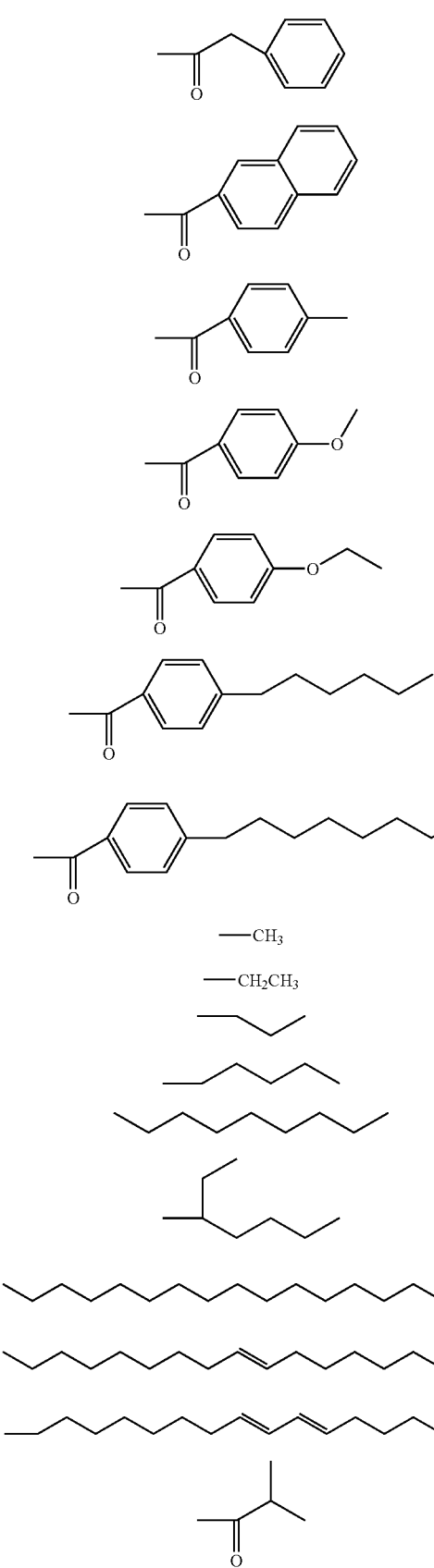
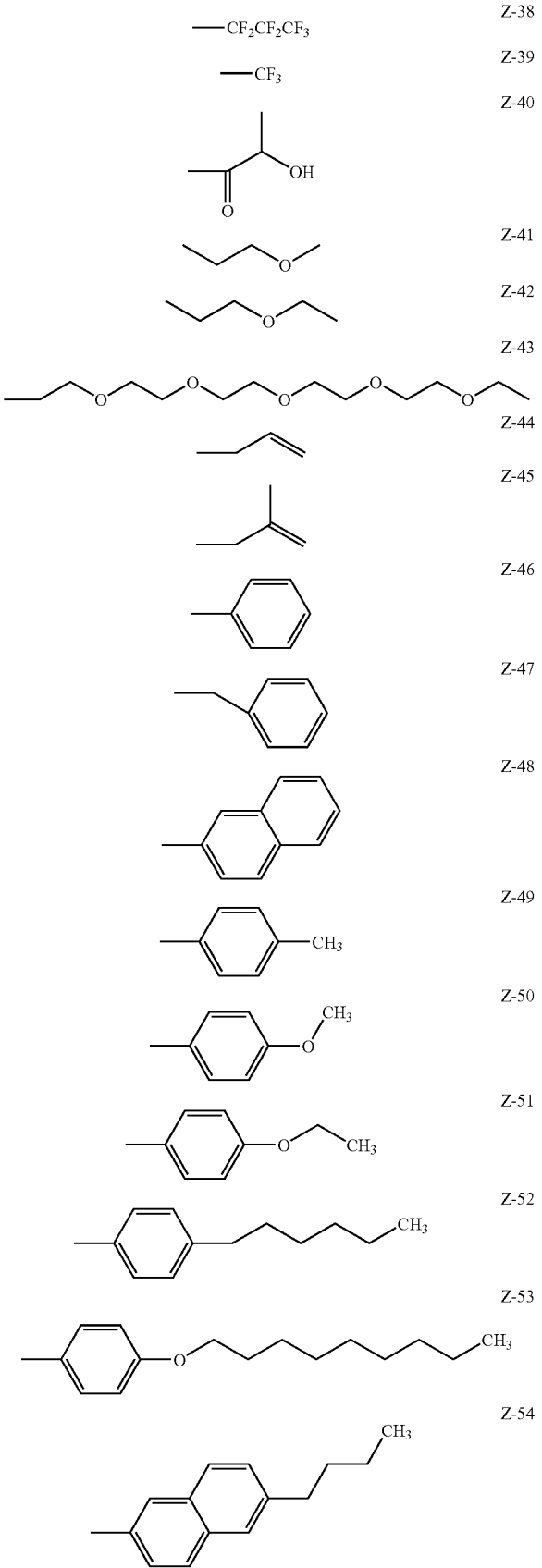

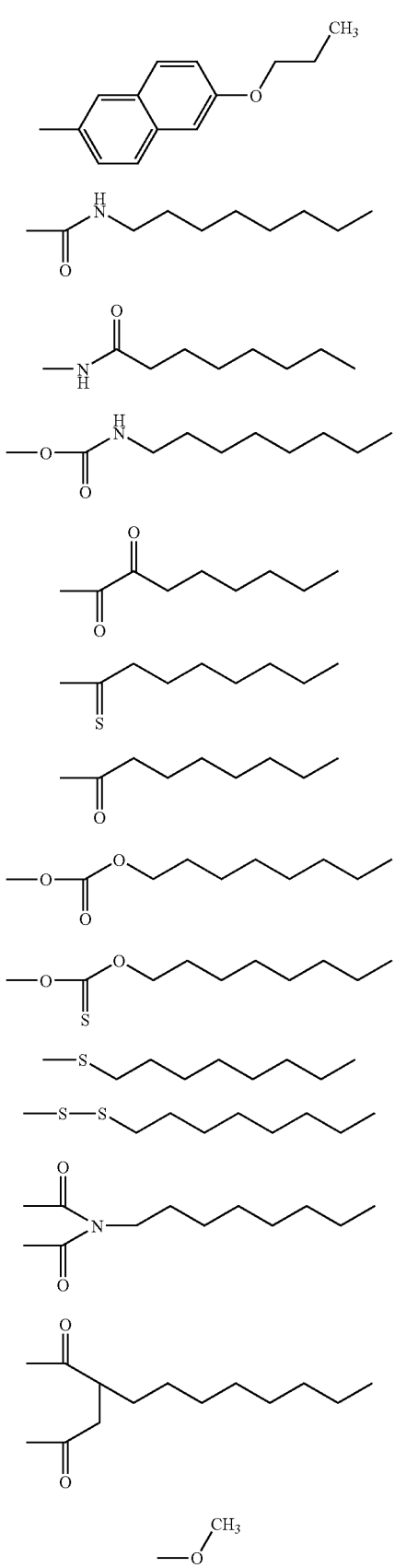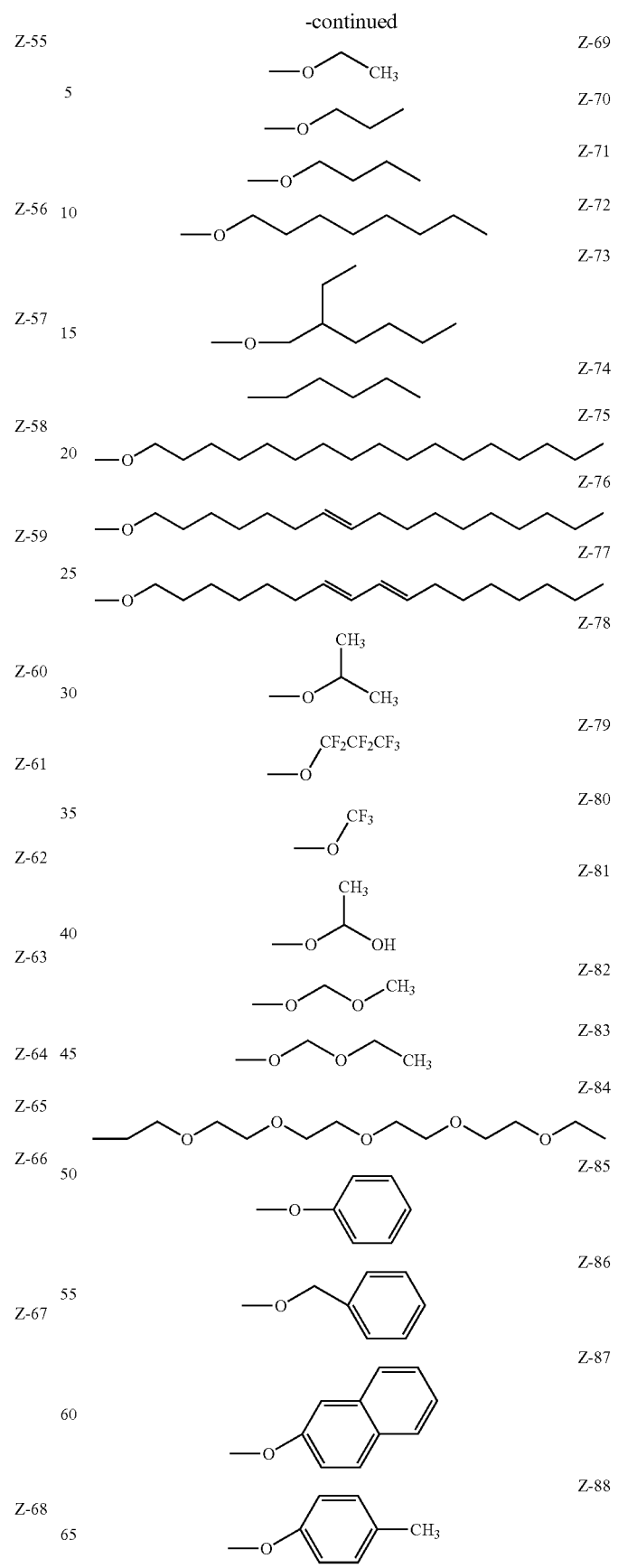

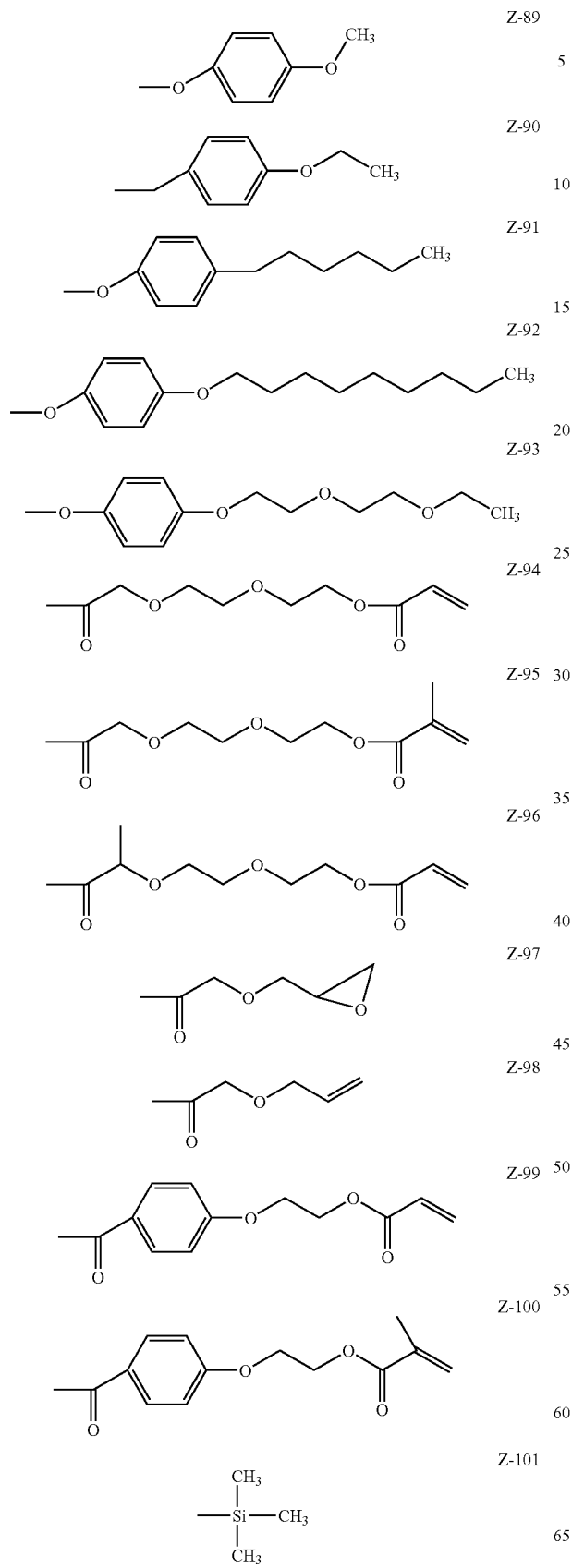
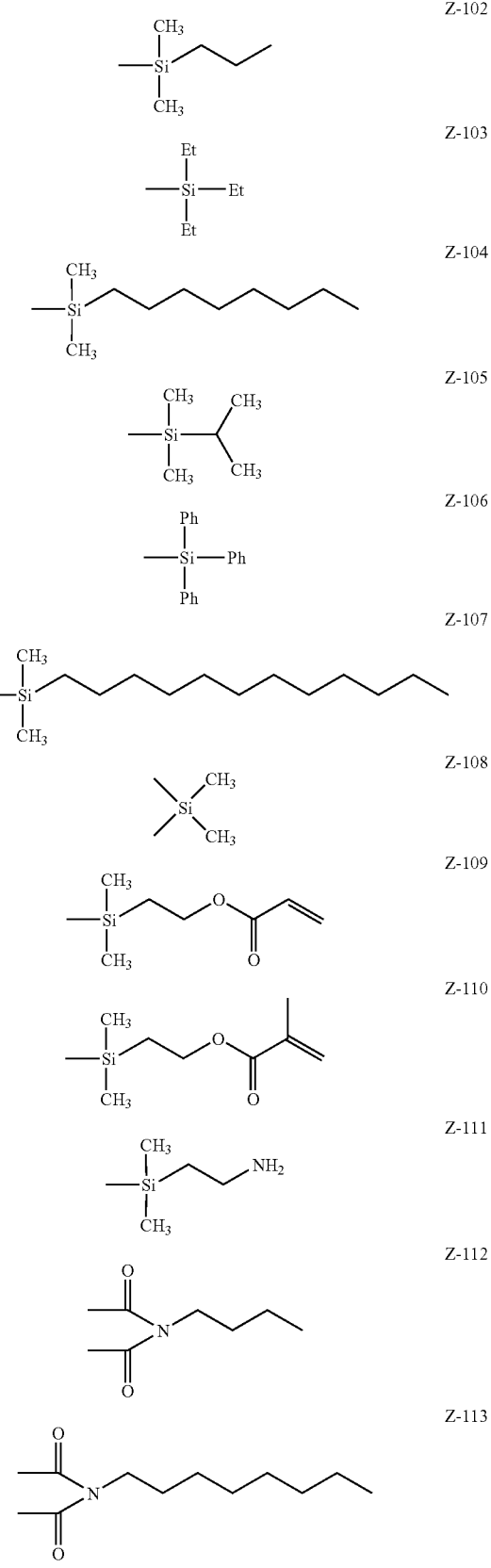

(Preferred Properties of Organic Crystal)

The organic crystal to be used in the invention may be one which meets only one of the foregoing requirements (1) to (4) or may be one which meets two or more of the foregoing requirements (1) to (4). In order to enhance the dispersibility into the matrix, it is preferable that any one or more of the requirements (1), (3) and (4) are met.

In the organic crystal to be used in the invention, its tensile elastic modulus is preferably 10 GPa or more, more preferably 50 GPa or more, and especially preferably 100 GPa or more. This is because when the elastic modulus is large, an effect for enhancing the performance of the hybrid composition becomes large. Such is effective for, for example, enhancing the elastic modulus or realizing low thermal expansion.

In the organic crystal to be used in the invention, its coefficient of thermal expansion is preferably not more than 20 ppm/° C., more preferably not more than 15 ppm/° C., and especially preferably not more than 10 ppm/° C. This is because when the coefficient of thermal expansion is small, an effect for lowering the thermal expansion after hybridization with the matrix becomes large.

It is preferable that the organic crystal to be used in the invention does not substantially contain a sulfate group. What the organic crystal does not substantially contain a sulfate group refers to the matter that the amount of sulfur derived from a sulfate group to be quantitatively determined by an analysis method such as an inductively coupled plasma (ICP) method is not more than 0.01 mmoles per gram of the organic crystal. When the organic substance does not substantially contain a sulfate group, there are brought advantages that a lowering of the heat decomposition temperature of the organic crystal is suppressed; that the organic crystal can be applied in a process at a higher temperature due to hybridization with the matrix resin; and that the heat resistance of the hybrid composition is enhanced. In particular, in the case where the organic crystal is crystalline cellulose, there is an effect for suppressing a lowering of the heat decomposition temperature. When the case of crystalline cellulose is taken as an example, examples of a method for preparing the organic crystal which does not substantially contain a sulfate group include a method by hydrolysis of microcrystalline cellulose with hydrochloric acid and a counter collision method disclosed in JP-A-2005-270891.

In the case where the organic crystal to be used in the invention contains a sulfate group, it is preferable that the inorganic ion corresponding to the amount of the sulfate group is adsorbed. In the case where the inorganic ion is monovalent, the amount of the inorganic ion to be adsorbed (molar ratio to the amount of the sulfate group) is preferably from 0.8 to 1.2, more preferably from 0.9 to 1.1, and especially preferably from 0.95 to 1.05. In the case where the inorganic ion is divalent, the amount of the inorganic ion to be adsorbed is preferably from 0.4 to 0.6, more preferably from 0.45 to 0.55, and especially preferably from 0.47 to 0.52. As the preferred inorganic ion, those described previously can be exemplified. When the inorganic ion is adsorbed, there is brought an effect for suppressing a lowering of the heat decomposition temperature due to the sulfate group. However, the adsorption of the inorganic ion lowers the dispersibility of the organic crystal of the invention into the matrix. In order to compensate the lowering of the dispersibility due to the inorganic ion, it is preferable that the surfactant is adsorbed on the organic crystal of the invention and/or modified with the organic group.

[Matrix Material]

The composition of the invention contains a matrix material.

The matrix material as referred to in the invention refers to a substance which exists in the surroundings of the organic crystal to be used in the invention and may be any of a gas, a liquid or a solid. Though the type of the matrix material to be used in the invention is not particularly limited, it is preferable to use a resin material. The resin may be used in combination of plural kinds thereof, and a thermoplastic resin, a solvent-soluble resin or a hardening resin can be favorably used. In the case where a thermoplastic resin is used, there is a characteristic that the composition of the invention is easily molded. Also, in the case where a thermoplastic resin or a hardening resin is used, there is a characteristic that optical anisotropy of the composition of the invention becomes small.

Examples of the thermoplastic resin include polyethylene, polypropylene, ABS resins, PMMA (polymethyl methacrylate), polystyrene, polycarbonates, polycycloolefins (for example, ZEONOR, manufactured by Zeon Corporation; ARTON, manufactured by JSR Corporation; TOPAS, manufactured by Polyplastics Co., Ltd.; APEL, manufactured by Mitsui Chemicals, Inc.), polylactic acid, cellulose acetate propionate, cellulose acetate butyrate, polyethersulfone, polyether imide, polyetheretherketone, polyphenylene sulfide, polyphenylene oxide, polycaprolactone, polyethylene terephthalate, polyethylene naphthalate, polybutylene terephthalate, polypropylene terephthalate, polybutylene succinate, poly-3-hydroxybutyrate, polyallylate, nylons, aramid, thermoplastic elastomers and silicone.

Examples of the hardening resin include acrylic resins, methacrylic resins, phenol resins, urea resins, melamine resins, unsaturated polyester resins, epoxy resins, silicone resins, diallyl phthalate resins, furan resins, bismaleimide resins and cyanate resins.

As the solvent-soluble resin, those which are soluble in water or an organic solvent can be used. Examples of an organic solvent capable of dissolving the solvent-soluble resin therein include methanol, ethanol, isopropanol, butanol, methylene chloride, chloroform, DMF (N,N-dimethylformamide), DMAc (N,N-dimethylacetamide), NMP (N-methylpyrrolidone), acetone, methyl ethyl ketone, methyl isobutyl ketone, cyclohexanone, 1,4-dioxane, THF, ethyl acetate, methyl acetate, acetonitrile, glycerin, ethylene glycol, 1,1,1,3,3,3-hexafluoroisopropanol, toluene, xylene, anisole, n-hexane, cyclohexane, 1,2-dichloroethane, acetic acid, trifluoroacetic acid, pyridine, DMSO (dimethyl sulfoxide), nitromethane and nitrobenzene. These solvents can be used singly or in admixture of plural kinds thereof.

There may be the case where it is preferable to choose the matrix material to be used depending upon the organic crystal to be used in the composition of the invention.

For example, in the case where an organic crystal on which a surfactant with high hydrophobicity as represented by the foregoing S-4 and S-10 is adsorbed is used, cellulose triacetate, cellulose diacetate, cellulose acetate propionate, cellulose acetate butyrate, polyethers, polyimides, polyamides, polylactic acid, polystyrene, polymethyl methacrylate, polyethylene, polypropylene, polyoxymethylene and the like are preferably used as the matrix resin. Also, in the case where an organic crystal to which a group with high hydrophobicity as represented by the foregoing Z-1, Z-3 and Z-20 is bonded as the group represented by the formula (1) is used, cellulose triacetate, cellulose diacetate, cellulose acetate propionate, cellulose acetate butyrate, polyesters, polyimides, polyamides, polylactic acid, polystyrene, polymethyl methacrylate, polyethylene, polypropylene, polyoxymethylene and the like are preferably used as the matrix resin.

As to a preferred combination of the organic crystal and the matrix material to be used in the composition of the invention, in the case where the organic crystal is cellulose, cellulose based resins such as cellulose triacetate, cellulose diacetate, cellulose acetate propionate and cellulose acetate butyrate; and aliphatic polyesters such as polylactic acid, polybutylene succinate and polyhydroxyalkanoates are preferable as the matrix material.

[Preparation Method of Composition]

The composition of the invention is obtained by mixing an organic crystal and a matrix material.

For example, in the case where the matrix material is a thermoplastic resin, the resin having been heated in a molten state can be mixed with the organic crystal using a twin-screw kneader or the like. The kneading temperature is preferably a temperature at which the melt viscosity of the thermoplastic resin becomes low and which is not higher than the heat decomposition temperature of the organic crystal.

In the case where the organic crystal is crystalline cellulose, the kneading temperature is preferably not higher than 270° C., more preferably not higher than 260° C., and especially preferably not higher than 250° C.

In the case where the matrix material is a solvent-soluble resin, the resin having been dissolved in a solvent can be mixed with the organic crystal. In the case of the solvent-soluble resin, there is an advantage that mixing can be achieved at a temperature sufficiently lower than the heat decomposition temperature of the organic crystal. Examples of the solvent to be used include water, methanol, ethanol, isopropanol, butanol, methylene chloride, chloroform, DMF (N,N-dimethylformamide), DMAc (N,N-dimethylacetamide), NMP (N-methylpyrrolidone), acetone, methyl ethyl ketone, methyl isobutyl ketone, cyclohexanone, 1,4-dioxane, THF, ethyl acetate, methyl acetate, acetonitrile, glycerin, ethylene glycol, 1,1,1,3,3,3-hexafluoroisopropanol, toluene, xylene, anisole, n-hexane, cyclohexane, 1,2-dichloroethane, acetic acid, trifluoroacetic acid, pyridine, DMSO (dimethyl sulfoxide), nitromethane and nitrobenzene. These solvents may be used as a mixed solvent of plural kinds thereof.

In the case where the matrix material is a hardening resin, mixing can be achieved by adding the organic crystal in a liquid monomer and/or prepolymer. On that occasion, a solvent may be properly used. The solvents as exemplified previously can be used as the solvent.

In the composition of the invention, a mixing mass ratio of the matrix to the organic crystal is usually from 1/0.01 to 1/3, preferably from 1/0.01 to 1/2, more preferably from 1/0.02 to 1/2, and further preferably from 1/0.03 to 1/1. When the proportion of the organic crystal is too small, there is a tendency that the effects for lowering the coefficient of thermal expansion and enhancing the elastic modulus are not substantially found; and when the proportion of the organic crystal is too large, there is a tendency that molding becomes difficult.

The composition of the invention may contain other component than the organic crystal and the matrix material. Examples of such other component include a heat stabilizer, a plasticizer, a UV absorber, a coloring agent, a rubber and an elastomer. The addition amount of such a component is preferably from 0.0001 to 20% by mass, more preferably from 0.0001 to 10% by mass, and further preferably from 0.0001 to 5% by mass.

[Article]

The composition of the invention can be used as an article. The article can be produced by a molding method. As a molding method, generally widely employed molding methods such as injection molding, extrusion molding, blow molding, vacuum molding, pressure molding, inflation molding, compression molding, transfer molding and powder molding can be utilized. Of these, injection molding, extrusion molding, compression molding, blow molding and powder molding are preferable. The shape and size of the molding can be properly determined depending upon the use purpose of the article. The article of the invention can be used as, for example, a structural material, a fiber, an optical component (for example, camera lenses, pickup lenses), a packing, a gear, a thin-walled component, a hard coat material.

[Film]

The composition of the invention can also be used as a film upon being subjected to production. The film of the invention includes one having a shape which is generally considered to be in a sheet form. As the production method of the film, known methods such a melt casting film formation method and a solution casting film formation method can be employed.

The film of the invention may be stretched. Stretching can be carried out by a roll uniaxial stretching method, a tenter uniaxial stretching method, a simultaneous biaxial stretching method, a sequential biaxial stretching method, an inflation method or a press stretching method.

Though the thickness of the film of the invention is not particularly limited, it is preferably from 30 to 700 μm, more preferably from 40 to 200 μm, and further preferably from 50 to 150 μm. Also, in any case, the haze is preferably not more than 3%, more preferably not more than 2%, and further preferably not more than 1%. Also, the total light transmittance is preferably 70% or more, more preferably 80% or more, and further preferably 85% or more.

In the film of the invention, its tensile elastic modulus is preferably 2 GPa or more, more preferably 3 GPa or more, and especially preferably 4 GPa or more. In the film of the invention, its coefficient of thermal expansion is preferably not more than 50 ppm/° C., more preferably not more than 30 ppm/° C., and especially preferably not more than 20 ppm/° C.

The film of the invention can be borne with an optical function according to the application. For example, it is possible to provide a film having an Re (in-plane retardation) and an Rth (retardation in a film thickness direction). The Re of the film of the invention is usually from 0 to 500 nm, preferably from 0 to 300 nm, and more preferably from 0 to 200 nm. In order to adjust the Re so as to fall within a preferred range, for example, a method for stretching the film can be employed. The Rth of the film of the invention is usually from 0 to 3,000 nm, preferably from 0 to 2,000 nm, and more preferably from 0 to 1,000 nm. In the case where it is intended to produce a film having an Rth controlled on a relatively low level, for example, a method of production without using a solvent can be employed. In the case of production without using a solvent, an effect for controlling the Rth is especially noticeable in the case of using the composition of the invention.

The film of the invention can be subjected to surface treatment or stacking. For example, for the purpose of enhancing adhesion to a component or the like, the film surface of the invention can be treated by a method including saponification, a corona treatment, a flame treatment and a glow discharge treatment. Also, an adhesive layer or an anchor layer maybe provided on at least one surface of the film. Furthermore, a variety of known functional layers such as a flattened layer, a hard coat layer, an ultraviolet ray absorbing layer, a surface roughed layer, a transparent conductive layer, a gas barrier layer and a solvent resistant layer can be provided on the film surface depending on the purpose.

The film of the invention can be used for an optical film, a retardation film, a polarizing plate protective film, a transparent conductive film, a display device substrate, a flexible display substrate, a flat panel display substrate, a solar cell substrate, a touch panel substrate, a flexible circuit substrate, an optical disc protective film, a magnetic recording medium substrate, a light control film, an agricultural film, a gas barrier film, a wrapping film, an electromagnetic radiation prevention film, a defense film, a vibration control film, a soundproof film, a vibration plate, a speaker corn, etc.

EXAMPLES

The characteristics of the invention are hereunder described in more detail with reference to the following Preparation Examples, Examples and Comparative Examples. Materials, use amounts, proportions, treatment contents, treatment procedures and the like as shown in the following Examples can be properly changed so far as the gist of the invention is not deviated. In consequence, it should not be construed that the scope of the invention is limitedly interpreted by the following specific examples.

[Measurement Methods]

The measurement methods used in the Preparation Examples, Examples and Comparative Examples are hereunder described.

(Size of Organic Crystal)

The size of an organic crystal was determined by observing it by a transmission electron microscope, totalizing the width (minor axis length) and the length (major axis length) of 100 particles chosen at random within a field of vision and calculating an average value of each of them.

(Quantitative Determination of Sulfate Group and Metal in Organic Crystal)

3 mL of $HNO_3$ was added to 50 mg of an organic crystal, and the mixture was incinerated by a microwave. Water was added to make 50 mL in total. This preparation liquid was analyzed by an inductively coupled plasma (ICP-OES) method, thereby quantitatively determining sulfur, sodium and calcium. The sulfur amount as detected herein was defined as a sulfate group amount.

(Heat Decomposition Temperature)

A loss in weight was measured under nitrogen at a temperature rise rate of 10° C./min using TG/DTA6200, manufactured by Seiko Instruments Inc., and a temperature at which the loss in weight was 2% was defined as a heat decomposition temperature.

(Weight Average Molecular Weight)

A weight average molecular weight was measured by GPC with tetrahydrofuran as a solvent as reduced into polystyrene using HLC-8120GPC, manufactured by Tosoh Corporation and determined while comparing with a molecular weight reference material of polystyrene.

(Thickness of Film)

A thickness of a film was measured by a dial thickness gauge using K402B, manufactured by Anritsu Corporation.

(Light Transmittance of Film)

A light transmittance of a film was measured by a spectrophotometer (UV-3100PC, manufactured by Shimadzu Corporation). A measured value was reduced into a value of transmittance in the case of a film thickness of 100 μm while defining a value at a measurement wavelength of 550 nm as a representative value.

(Haze of Film)

A haze of a film was measured by a haze meter (Haze Meter NDH2000, manufactured by Nippon Denshoku Industries Co., Ltd.).

(Coefficient of Linear Thermal Expansion of Film)

A film sample (19 mm×5 mm) was prepared and measured for coefficient of linear thermal expansion using TMA (EX-STAR 6000, manufactured by Seiko Instruments Inc.). A measurement rate was set up at 3° C./min. The measurement was carried out as to three samples, and an average value thereof was employed. The measurement was carried out in the temperature range of from 50° C. to 250° C., and the coefficient of linear thermal expansion was calculated in the range of from 100° C. to 150° C. at the time of temperature rise. However, as to a comparative sample having a glass transition temperature (Tg) of not higher than 200° C., the coefficient of linear thermal expansion was calculated in the temperature range of from 50° C. to (Tg–30)° C.

(Tensile Elastic Modulus of Film)

A film sample (piece of 1.0 cm×5.0 cm) was prepared and after allowing to stand overnight at 25° C. and at a relative humidity of 60%, measured for tensile elastic modulus under a condition at 25° C. and at a tensile rate of 3 mm/min using a tensilon (Tensilon RTM-25, manufactured by Toyo Baldwin Co., Ltd.) (distance between chucks: 3 cm). The measurement was carried out as to three samples, and an average value thereof was determined for evaluation.

(Retardation of Film)

A value at a wavelength of 589.3 nm was measured by a retardation analyzer (KOBRA-WR, manufactured by Oji Scientific Instruments).

(Surface Roughness of Film)

A surface roughness of a film was measured using Micromap MM3200 (manufactured by Micromap).

[Preparation of Cellulose Crystal]

Preparation Example 1

In a 3-liter three-necked flask, 50 g of crystalline cellulose (CEOLUS TGF20, manufactured by Asahi Kasei Chemicals Corporation) was charged, and 500 mL of 64% sulfuric acid (manufactured by Wako Pure Chemical Industries, Ltd.) which had been heated at 45° C. in advance was added in the flask. The suspension was kept warm on a water bath such that the temperature was 45° C. and stirred under nitrogen. Two hours after stirring, 500 mL of cold water was added step by step while cooling the water bath with ice such that the inner temperature did not exceed 45° C. The suspension was centrifuged (at 10,000 rpm for 10 minutes), and water washing and centrifugation were repeated for a residual precipitate. When the supernatant became cloudy, all the supernatant and the precipitate were recovered, and water was added such that the total sum of the supernatant and water to be supplemented was 2,000 mL. This liquid was ultrasonically treated for one hour. The suspension was centrifuged to obtain a cloudy supernatant. This cloudy liquid was recovered and dialyzed with distilled water to obtain an aqueous dispersion of a cellulose crystal (hereinafter referred to as "dispersion 1"). This was freeze-dried to obtain a cellulose crystal powder (hereinafter referred to as "W0"). A proportion of the cellulose crystal in the dispersion was 0.94% by weight. As a result of observation by a transmission electron microscope, the size of the cellulose crystal was 8 nm in average minor axis length and 158 nm in average major axis length.

The dispersion 1 was neutralized with 0.2 moles/L of a sodium hydroxide aqueous solution and dialyzed with distilled water to obtain a sodium-neutralized dispersion (hereinafter referred to as "dispersion 2"). This was freeze-dried to obtain a cellulose crystal powder (hereinafter referred to as "W1").

Preparation Example 2

A dispersion of a cellulose crystal dispersion (hereinafter referred to as "dispersion 3") was obtained by a method described in *Macromolecules*, Vol. 28, pages 6365 to 6367 (1995). A proportion of the cellulose crystal in the dispersion 3 was 0.61% by weight. As a result of observation by a transmission electron microscope, the size of the cellulose crystal was 10 nm in average minor axis length and 1,255 nm in average major axis length.

The dispersion 3 was neutralized with 0.2 moles/L of a sodium hydroxide aqueous solution and dialyzed with distilled water to obtain a sodium-neutralized dispersion (hereinafter referred to as "dispersion 3Na"). This was freeze-dried to obtain a cellulose crystal powder (hereinafter referred to as "WT1").

Preparation Example 3

An aqueous dispersion of a cellulose crystal (hereinafter referred to as "dispersion 4") was obtained in the same manner as in Preparation Example 1, except for using linter pulp as the raw material. A proportion of the cellulose crystal in the dispersion 4 was 0.55% by weight. As a result of observation by a transmission electron microscope, the size of the cellulose crystal was 5 nm in average minor axis length and 326 nm in average major axis length.

The dispersion 4 was neutralized with 0.2 moles/L of a sodium hydroxide aqueous solution and dialyzed with distilled water to obtain a sodium-neutralized dispersion (hereinafter referred to as "dispersion 4Na"). This was freeze-dried to obtain a cellulose crystal powder (hereinafter referred to as "WC1").

Preparation Example 4

An aqueous dispersion of a cellulose crystal (hereinafter referred to as "dispersion 5") was obtained by a method (hydrolysis method of microcrystalline cellulose with hydrochloric acid) described in *Langmuir*, Vol. 17, pages 21 to 27. A proportion of the cellulose crystal in the dispersion 5 was 0.66% by weight. As a result of observation by a transmission electron microscope, the size of the cellulose crystal was 7 nm in average minor axis length and 165 nm in average major axis length.

This was freeze-dried to obtain a cellulose crystal powder (hereinafter referred to as "WE1").

[Adsorption by Surfactant]

Preparation Example 5

1.07 g of tributylstearylphosphonium bromide (manufactured by Aldrich) was added in one liter of the dispersion 2 as prepared in Preparation Example 1, and the mixture was stirred at room temperature for one hour. A precipitate was separated by centrifugation, and water washing and centrifugation were repeated three times. An ultimate precipitate was dialyzed in running water of distilled water and then freeze-dried to obtain a surfactant-adsorbed cellulose crystal (hereinafter referred to as "W2").

Preparation Example 6

A surfactant-adsorbed cellulose crystal (hereinafter referred to as "W3") was obtained in the same operation as in Preparation Example 5, except for using 1.02 g of tributylhexadecylphosphonium bromide (manufactured by Aldrich) as the surfactant in place of the tributylstearylphosphonium bromide.

Preparation Example 7

A surfactant-adsorbed cellulose crystal (hereinafter referred to as "W4") was obtained in the same operation as in Preparation Example 5, except for using 0.69 g of trimethylstearylammonium chloride as the surfactant in place of the tributylstearylphosphonium bromide.

Preparation Example 8

A surfactant-adsorbed cellulose crystal (hereinafter referred to as "W5") was obtained in the same operation as in Preparation Example 5, except for using 2.24 g of dimethyldistearylammonium chloride as the surfactant in place of the tributylstearylphosphonium bromide.

Preparation Example 9

A surfactant-adsorbed cellulose crystal (hereinafter referred to as "W6") was obtained in the same operation as in Preparation Example 5, except that after stirring the precipitate after water washing in a calcium hydroxide aqueous solution (0.01% by weight) for one hour, the operation of centrifugation and water washing was supplemented.

Preparation Example 10

A surfactant-adsorbed cellulose crystal (hereinafter referred to as "WT2") was obtained in the same operation as in Preparation Example 4, except for using one liter of the dispersion 3 as the dispersion.

Preparation Example 11

A surfactant-adsorbed cellulose crystal (hereinafter referred to as "WC2") was obtained in the same operation as in Preparation Example 4, except for using one liter of the dispersion 4 as the dispersion.

Preparation Example 12

The dispersion 1 as prepared in Preparation Example 1 was neutralized with a tetrabutylammonium hydroxide aqueous solution and dialyzed with distilled water. This was freeze-dried to obtain a surfactant-adsorbed cellulose crystal (hereinafter referred to as "WA1").

[Modification by Chemical Bond]

Preparation Example 13

1.0 g of W1 as prepared in Preparation Example 1 was provided and added in 50 mL of dehydrated DMAC, and the mixture was ultrasonically treated to obtain a DMAc dispersion. 1.42 mL (15 mmoles) of acetic anhydride, 1.82 mL (22.5 mmoles) of pyridine and 10 mg of dimethylaminopyridine were added thereto, and the mixture was heated under nitrogen at 100° C. for 5 hours. The reaction liquid was thrown into 250 mL of a water/methanol mixed solution (volume ratio: 1/1) having 3 g of sodium chloride dissolved therein, and after stirring, a precipitate was recovered by centrifugation. An operation of stirring of the precipitate in a water/methanol mixed solution (volume ratio: 1/1) and centrifugation was repeated two times. The precipitate was freeze-dried to obtain an acetylated cellulose crystal (hereinafter referred to as "W7").

Preparation Example 14

A butyrylated cellulose crystal (hereinafter referred to as "W8") was obtained in the same operation as in Preparation Example 13, except for using butyric anhydride in place of the acetic anhydride.

Preparation Example 15

A benzoylated cellulose crystal (hereinafter referred to as "W9") was obtained in the same operation as in Preparation Example 13, except for using benzoic acid chloride in place of the acetic anhydride.

Preparation Example 16

An octanoylated cellulose crystal (hereinafter referred to as "W10") was obtained in the same operation as in Preparation Example 13, except for using octanoic acid chloride in place of the acetic anhydride.

Preparation Example 17

A trifluoroacetylated cellulose crystal (hereinafter referred to as "W11") was obtained in the same operation as in Preparation Example 13, except for using trifluoroacetic anhydride in place of the acetic anhydride.

Preparation Example 18

The same operation as in Preparation Example 13 was followed, and the precipitate after water washing was stirred in a calcium hydroxide aqueous solution (0.01% by weight) for one hour and then dialyzed in distilled water for 2 days. A dispersion after the dialysis was freeze-dried to obtain an acetylated cellulose crystal (hereinafter referred to as "W12")

Preparation Example 19

The same operation as in Preparation Example 14 was followed, and the precipitate after water washing was stirred in a calcium hydroxide aqueous solution (0.01% by weight) for one hour and then dialyzed in distilled water for 2 days. A dispersion after the dialysis was freeze-dried to obtain a butyrylated cellulose crystal (hereinafter referred to as "W13").

Preparation Example 20

A butyrylated cellulose crystal (hereinafter referred to as "WE2") was obtained in the same operation as in Preparation Example 14, except for using WE1 as the raw material.

[Heat Decomposition Temperature of Cellulose Crystal]

The measured values of sulfate group and metal ion and the heat decomposition temperature of the cellulose crystal as prepared in each of Preparation Examples 1, 3, 14, 18, 19 and 20 were summarized in the following Table 1.

TABLE 1

| Preparation Example | Cellulose crystal | Sulfate group mmole/g | Na mmole/g | Ca mmole/g | Heat decomposition temperature ° C. |
|---|---|---|---|---|---|
| 1 | W0 | 0.34 | <0.01 | <0.01 | 113 |
| 1 | W1 | 0.34 | 0.33 | <0.01 | 264 |
| 3 | WE1 | <0.01 | <0.01 | <0.01 | 262 |
| 13 | W7 | 0.18 | <0.01 | <0.01 | 151 |
| 18 | W12 | 0.18 | <0.01 | 0.09 | 252 |
| 14 | W8 | 0.15 | <0.01 | <0.01 | 153 |
| 19 | W13 | 0.15 | <0.01 | 0.07 | 254 |
| 20 | WE2 | <0.01 | <0.01 | <0.01 | 260 |

In WE1 and WE2 each of which does not substantially contain a sulfate group (<0.01 mmoles/g), the heat decomposition temperature is high. In W0, W7 and W8 each of which contains a sulfate group, the heat decomposition temperature is low. By adsorbing an alkali metal ion thereon, it is possible to increase the heat decomposition temperature. When the heat decomposition temperature is high, in a hybridization process with a matrix resin, it is possible to employ a method of exposing to a high temperature such as melt kneading.

[Preparation of Composition and Film]

Example 1

W2 (2.0 g) as prepared in Preparation Example 5 was added in 80 mL of DMAc, and the mixture was ultrasonically treated to prepare a uniform dispersion. 18.0 g of P-1 (weight average molecular weight: 83,000) represented by the following structural formula was added thereto, and the mixture was stirred by a rotor mixer to prepare a dope. The dope was spread on a glass plate and cast in a clearance of 800 μm by an applicator. A lid was covered on the glass plate; and after drying in an air dryer at 120° C. for 2 hours, the resulting dope was stripped off from the glass plate, fixed to a metal frame and dried in a vacuum dryer at 80° C. for one hour, at 100° C. for one hour, at 120° C. for one hour, at 140° C. for one hour and at 150° C. for one hour, respectively. The film was taken out from the dryer and cooled to room temperature to prepare a film F-1 having a thickness of 85 μm.

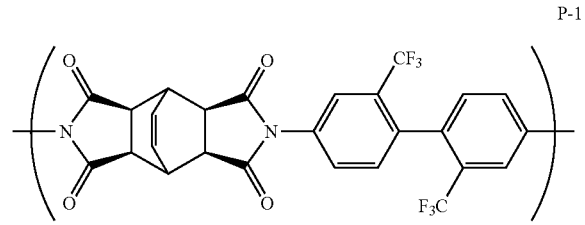

Example 2

A film F-2 was prepared in the same operation as in Example 1, except for using W2 (6.0 g) and P-1 (14.0 g).

Example 3

A film F-3 was prepared in the same operation as in Example 1, except for using W2 (10.0 g) and P-1 (10.0 g).

Example 4

A film F-4 was prepared in the same operation as in Example 2, except for using P-2 (weight average molecular weight: 80,000) represented by the following structural formula as the resin.

Example 8

W8 (4.0 g) as prepared in Preparation Example 14 was mixed with 16.0 g of a mixture of dicyclopentadienyl diacrylate, acryloylethoxy bisphenol A and 1-hydroxyphenyl ketone (weight ratio: 60/40/2) to prepare a uniform mixture.

The mixed liquid was spread on a glass plate and cast by an applicator (clearance: 100 μm). After irradiating with UV at 1,000 mJ/cm$^2$, the resulting glass plate was heated under nitrogen in an inert oven at 100° C. for one hour and at 170° C. for one hour, respectively, thereby hardening the matrix. According to these operations, a film F-8 having a thickness of 90 μm was obtained.

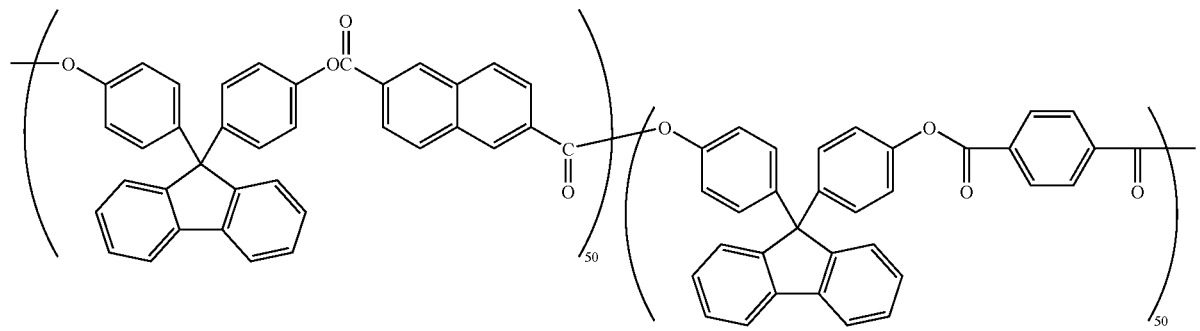

P-2

Example 5

WA1 (6.0 g) as prepared in Preparation Example 12 was added in 115 mL of N,N-dimethylacetamide, and the mixture was ultrasonically treated to prepare a uniform dispersion. 14.0 g of cellulose diacetate (degree of substitution of acetyl group: 2.15) was added thereto, and the mixture was stirred by a rotor mixer to prepare a uniform dope. The dope was spread on a glass plate and cast by an applicator (clearance: 800 μm). A lid was covered on the glass plate; and after drying in an air dryer at 120° C. for 2 hours, the resulting dope was stripped off from the glass plate, fixed to a metal frame and then dried in a vacuum dryer at 80° C. for one hour, at 100° C. for one hour, at 120° C. for one hour, at 140° C. for one hour and at 150° C. for one hour, respectively. The film was taken out from the dryer and cooled to room temperature to prepare a film F-5 having a thickness of 85 μm.

Example 6

A film F-6 was prepared in the same operation as in Example 2, except for using polycarbonate (weight average molecular weight: 60,000) as the resin.

Example 7

A film F-7 was prepared in the same operation as in Example 2, except for using polystyrene (weight average molecular weight: 75,000) as the resin.

Example 9

A film F-9 was prepared in the same operation as in Example 1, except for using WT2 (6.0 g) as prepared in Preparation Example 10 and P-1 (14.0 g).

Example 10

A film F-10 was prepared in the same operation as in Example 1, except for using WC2 (6.0 g) as prepared in Preparation Example 11 and P-1 (14.0 g).

Example 11

A film F-11 was prepared in the same operation as in Example 1, except for using WE2 (6.0 g) and P-1 (14.0 g).

Example 12

A film F-12 was prepared in the same operation as in Example 1, except for using WA1 (6.0 g) and P-1 (14.0 g).

Example 13

A film F-13 was prepared in the same operation as in Example 1, except for using W13 (6.0 g) and cellulose acetate propionate (CAP 482-20, manufactured by Eastman Chemical Company: 14.0 g).

Example 14

A film F-14 was prepared in the same operation as in Example 1, except for using WA1 (6.0 g) and cellulose acetate propionate (14.0 g).

Comparative Example 1

A film H-1 was prepared in the same operation as in Example 1, except for using W1 (6.0 g) and P-1 (14.0 g).

Comparative Example 2

A sheet composed of a cellulose microfibril (hereinafter referred to as "HS-1") was prepared in a method described in Preparation Example 1 of JP-A-2005-60680. As a result of observation by a transmission electron microscope, long fibers having an average width of 10 nm and a length of 100 μm or more were three-dimensionally entangled. This sheet was impregnated with, as a hardening matrix, a mixture of dicyclopentadienyl diacrylate, bis[(4-acryloylethoxy)phenyl]isopropylidene and 1-hydroxyphenyl ketone (weight ratio: 60/40/2) in a method described in Examples 1 to 3 of JP-A-2005-60680. At that time, the sheet was impregnated with this mixture in an amount of 30% by weight. After irradiating with UV at 1,000 mJ/cm$^2$, the resulting sheet was heated under nitrogen in an inert oven at 100° C. for one hour and at 170° C. for one hour, respectively, thereby hardening the matrix. According to these operations, a film H-2 having a thickness of 52 μm was obtained.

Comparative Example 3

Though it was intended to impregnate HS-1 with a DMAc solution of P-1 (10% by weight) in a method described in Examples 1 to 3 of JP-A-2005-60680, HS-1 was not substantially impregnated.

Comparative Example 4

Though it was intended to impregnate HS-1 with a DMAc solution of cellulose diacetate (degree of substitution of acetyl group: 2.15) (10% by weight) in a method described in Examples 1 to 3 of JP-A-2005-60680, HS-1 was not substantially impregnated.

Comparative Example 5

Though it was intended to impregnate HS-1 with a DMAC solution of cellulose acetate propionate (10% by weight) in a method described in Examples 1 to 3 of JP-A-2005-60680, HS-1 was not substantially impregnated.

Comparative Example 6

A film H-3 having a thickness of 90 μm was obtained in the same operation as in Example 1, except for using 2.0 g of, as a filler, an aluminum borate whisker (ALBOREX YS3A having a fiber diameter of from 0.5 to 1.0 μm and a fiber length of from 10 to 30 μm, manufactured by Shikoku Chemicals Corporation, the surface of which is modified with an aminosilane based material; hereinafter referred to as "YS3A") and 18.0 g of P-1.

Comparative Example 7

A film H-4 was obtained in the same operation as in Example 4, except for using 2.0 g of YS3A as the filler and 18.0 g of cellulose diacetate.

Comparative Example 8

A film H-5 was obtained in the same operation as in Example 5, except for using 2.0 g of YS3A as the filler and 18.0 g of cellulose acetate propionate.

Comparative Example 9

A film H-6 composed of P-1 was obtained in the same operation as in Example 1, except for not adding W2.

Comparative Example 10

A film H-7 composed of P-2 was obtained in the same operation as in Example 4, except for not adding W2.

Comparative Example 11

A film H-8 composed of cellulose diacetate was obtained in the same operation as in Example 5, except for not adding WA1.

Comparative Example 12

A film H-9 composed of cellulose acetate propionate was obtained in the same operation as in Example 13, except for not adding W13.

Comparative Example 13

A surface-acetylated sheet composed of a cellulose microfibril produced from acetic acid bacteria (hereinafter referred to as "HS-2") was prepared in a method described in Example 5 of JP-A-2005-60680. As a result of observation by a transmission electron microscope, long fibers having an average width of 10 nm and a length of 100 μm or more were three-dimensionally entangled. This sheet was impregnated with, as a hardening matrix, a mixture of dicyclopentadienyl diacrylate, bis[(4-acryloylethoxy)phenyl]isopropylidene and 1-hydroxyphenyl ketone (weight ratio: 60/40/2) in a method described in Examples 1 to 3 of JP-A-2005-60680. After irradiating with UV at 1,000 mJ/cm$^2$, the resulting sheet was heated under nitrogen in an inert oven at 100° C. for one hour and at 170° C. for one hour, respectively, thereby hardening the matrix. According to these operations, a film H-10 having a thickness of 53 μm was obtained.

Comparative Example 14

Though it was intended to impregnate HS-2 with a DMAc solution of P-1 (10% by weight) in a method described in Examples 1 to 3 of JP-A-2005-60680, HS-2 was not substantially impregnated.

[Measurement Results]

The measurement results of the above-prepared films F-1 to F-14 and H-1 to H-10 are shown in the following Table 2. As to the films H-3 to H-5, the degree of cloudiness of the film was large, and the light transmittance was low, and therefore, the light transmission, haze, Re and Rth could not be measured. Also, as to the film H-1, the light scattering of the film was large so that the Re and Rth could not be measured.

TABLE 2

| | | Configuration of film | | | | |
|---|---|---|---|---|---|---|
| | | Crystalline organic substance | | | | |
| | Film Type | Type | | Average minor axis length (nm) | Average major axis length (nm) | Matrix material Type |
| Ex. 1 | F-1 | Cellulose crystal | W2 | 8 | 158 | P-1 |
| Ex. 2 | F-2 | Cellulose crystal | W2 | 8 | 158 | P-1 |
| Ex. 3 | F-3 | Cellulose crystal | W2 | 8 | 158 | P-1 |
| Ex. 4 | F-4 | Cellulose crystal | W2 | 8 | 158 | P-2 |
| Ex. 5 | F-5 | Cellulose crystal | WA1 | 8 | 158 | Cellulose diacetate |
| Ex. 6 | F-6 | Cellulose crystal | W2 | 8 | 158 | Polycarbonate |
| Ex. 7 | F-7 | Cellulose crystal | W2 | 8 | 158 | Polystyrene |
| Ex. 8 | F-8 | Cellulose crystal | W8 | 8 | 158 | Hardening resin |
| Ex. 9 | F-9 | Cellulose crystal | WT2 | 10 | 1255 | P-1 |
| Ex. 10 | F-10 | Cellulose crystal | WC2 | 5 | 326 | P-1 |
| Ex. 11 | F-11 | Cellulose crystal | WE2 | 7 | 168 | P-1 |
| Ex. 12 | F-12 | Cellulose crystal | WA1 | 8 | 158 | P-1 |
| Ex. 13 | F-13 | Cellulose crystal | W13 | 8 | 158 | Cellulose acetate propionate |
| Ex. 14 | F-14 | Cellulose crystal | WA1 | 8 | 158 | Cellulose acetate propionate |
| Com. Ex. 1 | H-1 | Cellulose crystal | W1 | 8 | 158 | P-1 |
| Com. Ex. 2 | H-2 | Cellulose microfibril | HS-1 | 10 | 100,000 or more | Hardening resin |
| Com. Ex. 3 | — | Cellulose microfibril | HS-1 | 10 | 100,000 or more | P-1 |
| Com. Ex. 4 | — | Cellulose microfibril | HS-1 | 10 | 100,000 or more | Cellulose diacetate |
| Com. Ex. 5 | — | Cellulose microfibril | HS-1 | 10 | 100,000 or more | Cellulose acetate propionate |
| Com. Ex. 6 | H-3 | Aluminum borate whisker | YS3A | 750 | 20,000 | P-1 |
| Com. Ex. 7 | H-4 | Aluminum borate whisker | YS3A | 750 | 20,000 | Cellulose diacetate |
| Com. Ex. 8 | H-5 | Aluminum borate whisker | YS3A | 750 | 20,000 | Cellulose acetate propionate |
| Com. Ex. 9 | H-6 | | | No | | P-1 |
| Com. Ex. 10 | H-7 | | | No | | P-2 |
| Com. Ex. 11 | H-8 | | | No | | Cellulose diacetate |
| Com. Ex. 12 | H-9 | | | No | | Cellulose acetate propionate |
| Com. Ex. 13 | H-10 | Acetylated cellulose microfibril | HS-2 | 10 | 100,000 or more | Hardening resin |
| Com. Ex. 14 | — | Acetylated cellulose microfibril | HS-2 | 10 | 100,000 or more | P-1 |

| | Evaluation of film | | | | | | |
|---|---|---|---|---|---|---|---|
| | Light transmittance (%) | Haze (%) | Coefficient of thermal expansion (ppm/° C.) | Tensile elastic modulus (GPa) | Re (nm) | Rth (nm) | Surface roughness (nm) |
| Ex. 1 | 84 | 0.5 | 38 | 3.9 | 10.0 | 1810 | 2.5 |
| Ex. 2 | 83 | 0.7 | 27 | 5.7 | 11.0 | 1950 | 3.0 |
| Ex. 3 | 82 | 0.9 | 19 | 8.3 | 10.0 | 2030 | 2.6 |
| Ex. 4 | 82 | 0.8 | 35 | 5.7 | 8.5 | 1500 | 2.8 |
| Ex. 5 | 85 | 0.7 | 40 | 7.8 | 2.6 | 850 | 1.9 |
| Ex. 6 | 83 | 0.9 | 38 | 5.5 | 4.8 | 920 | 3.2 |
| Ex. 7 | 83 | 0.8 | 37 | 5.7 | 7.1 | 840 | 2.7 |
| Ex. 8 | 83 | 0.8 | 30 | 5.9 | 1.2 | 30 | 2.0 |
| Ex. 9 | 85 | 0.5 | 23 | 5.8 | 8.3 | 1920 | 4.8 |
| Ex. 10 | 84 | 0.5 | 24 | 5.7 | 7.5 | 1915 | 2.1 |
| Ex. 11 | 84 | 0.5 | 24 | 5.7 | 5.5 | 1900 | 2.9 |
| Ex. 12 | 85 | 0.5 | 23 | 5.8 | 6.2 | 1890 | 3.5 |
| Ex. 13 | 82 | 0.6 | 32 | 4.1 | 4.3 | 825 | 2.1 |
| Ex. 14 | 83 | 0.7 | 31 | 4.2 | 3.6 | 840 | 1.9 |
| Com. Ex. 1 | 65 | 12.5 | 29 | 5.5 | Impossible to achieve measurement | | 5.6 |
| Com. Ex. 2 | 70 | 8.6 | 10 | 30.0 | 25.0 | 2500 | 58 |
| Com. Ex. 3 | Not penetrated and impossible to achieve hybridization | | | | | | |
| Com. Ex. 4 | Not penetrated and impossible to achieve hybridization | | | | | | |
| Com. Ex. 5 | Not penetrated and impossible to achieve hybridization | | | | | | |
| Com. Ex. 6 | Impossible to achieve measurement | | 29 | 4.0 | Impossible to achieve measurement | | 100 or more |
| Com. Ex. 7 | Impossible to achieve measurement | | 42 | 6.2 | Impossible to achieve measurement | | 100 or more |
| Com. Ex. 8 | Impossible to achieve measurement | | 39 | 3.0 | Impossible to achieve measurement | | 100 or more |
| Com. Ex. 9 | 85 | 0.5 | 45 | 3.0 | 2.5 | 1700 | 1.2 |
| Com. Ex. 10 | 84 | 0.5 | 70 | 3.1 | 3.5 | 750 | 1.3 |
| Com. Ex. 11 | 90 | 0.4 | 95 | 4.8 | 0.1 | 40 | 1.1 |

TABLE 2-continued

| Com. Ex. 12 | 90 | 0.2 | 87 | 1.7 | 0.5 | 25 | 1.2 |
|---|---|---|---|---|---|---|---|
| Com. Ex. 13 | 75 | 7.8 | 12 | 29.0 | 20 | 2500 | 45 |
| Com. Ex. 14 | Not penetrated and impossible to achieve hybridization | | | | | | |

In the films composed of the composition of the invention, it was possible to lower the coefficient of thermal expansion and enhance the elastic modulus while keeping high transparency. On the other hand, in the composition using a cellulose microfibril in the Comparative Examples, the haze became large, and it was impossible to achieve hybridization with a matrix other than the hardening monomer. In the case of using an aluminum borate whisker, while it was possible to achieve production, the transparency was largely lowered due to the matter that the whisker was large. By using an organic crystal in a matrix material according to the invention, it was possible to make the obtained film have a large Re.

Example 15

A mixture obtained by stirring and mixing 10 g of W13 and 40 g of cellulose acetate propionate was melt kneaded at 220° C. in a twin-screw kneader (ULT Nano 15TW, manufactured by Technovel Corporation). The thus prepared strand was cut to prepare a hybrid pellet. The pellet was pressed by a heat press under a condition at 220° C. under 5 MPa, thereby preparing a heat molded film F-15.

Example 16

A hybrid pellet and a heat molded film F-16 were prepared in the same manner as in Example 15, except for using WE2.

Example 17

A mixture obtained by stirring and mixing 10 g of W13 and 40 g of polylactic acid (LACEA H-100, manufactured by Mitsui Chemicals, Inc.) was melt kneaded at 190° C. in a twin-screw kneader (ULT Nano 15TW, manufactured by Technovel Corporation). The thus prepared strand was cut to prepare a hybrid pellet. The pellet was pressed by a heat press under a condition at 200° C. under 5 MPa, thereby preparing a heat molded film F-17.

Comparative Example 15

HS-1 was cut in a size of 2 mm in square and subjected to twin-screw kneading together with cellulose acetate propionate in the same manner as in Example 15. However, kneading could not be substantially achieved, and HS-1 remained in a form as it was.

Comparative Example 16

HS-2 was cut in a size of 2 mm in square and subjected to twin-screw kneading together with cellulose acetate propionate in the same manner as in Example 15. However, kneading could not be substantially achieved, and HS-2 remained in a form as it was.

Comparative Example 17

A heat molded film H-11 was prepared in the same manner as in Example 15, except for pelletizing the cellulose acetate propionate without adding W13.

Comparative Example 18

A heat molded film H-12 was prepared in the same manner as in Example 17, except for pelletizing the polylactic acid without adding W13.

[Measurement Results]

The measurement results of the above-prepared films F-15 to F-17 and H-11 to H-12 are shown in the following Table 3.

In the films composed of the composition of the invention, it was possible to lower the coefficient of thermal expansion and to enhance the elastic modulus while keeping high transparency similar to the films prepared from the solution. On the other hand, in the composition using a cellulose microfibril in the Comparative Examples, it was impossible to achieve melt kneading. Also, by performing the production by heat molding, it was possible to prepare a film having a lowered Rth and more optical anisotropy.

TABLE 3

| | | Configuration of film | | | | |
|---|---|---|---|---|---|---|
| | | | Crystalline organic substance | | | |
| | Film Type | Type | | Average minor axis length (nm) | Average major axis length (nm) | Matrix material Type |
| Ex. 15 | F-15 | Cellulose crystal | W13 | 8 | 158 | Cellulose acetate propionate |
| Ex. 16 | F-16 | Cellulose crystal | WE2 | 8 | 158 | Cellulose acetate propionate |
| Ex. 17 | F-17 | Cellulose crystal | W13 | 8 | 158 | Polylactic acid |
| Com. Ex. 15 | — | Cellulose microfibril | HS-1 | 10 | 100,000 or more | Cellulose acetate propionate |
| Com. Ex. 16 | — | Acetylated cellulose microfibril | HS-2 | 10 | 100,000 or more | Cellulose acetate propionate |
| Com. Ex. 17 | H-11 | | | No | | Cellulose acetate propionate |
| Com. Ex. 18 | H-12 | | | No | | Polylactic acid |

TABLE 3-continued

| | Evaluation of film | | | | | | |
|---|---|---|---|---|---|---|---|
| | Light transmittance (%) | Haze (%) | Coefficient of thermal expansion (ppm/° C.) | Tensile elastic modulus (GPa) | Re (nm) | Rth (nm) | Surface roughness (nm) |
| Ex. 15 | 80 | 1.2 | 45 | 3.2 | 4 | 80 | 1.9 |
| Ex. 16 | 80 | 2.0 | 43 | 3.1 | 3 | 65 | 1.9 |
| Ex. 17 | 82 | 1.8 | 49 | 2.8 | 5 | 54 | 2.2 |
| Com. Ex. 15 | | | Impossible to achieve kneading | | | | |
| Com. Ex. 16 | | | Impossible to achieve kneading | | | | |
| Com. Ex. 17 | 90 | 0.2 | 87 | 1.7 | 0.5 | 25 | 1.2 |
| Com. Ex. 18 | 90 | 0.5 | 85 | 1.8 | 1.2 | 3.5 | 1.5 |

INDUSTRIAL APPLICABILITY

According to the invention, it is possible to provide an article and a film each having transparency, low thermal expansion properties and high elastic modulus using a wide-ranging matrix material. In particular, by choosing a thermoplastic resin as the matrix material, it is possible to provide a composition with processability and to easily produce an article and a film each having the foregoing characteristics. In consequence, the invention is high in industrial applicability.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 195485/2007 filed on Jul. 27, 2007 and Japanese Patent Application No. 85519/2008 filed on Mar. 28, 2008, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A composition comprising an organic crystal having a minor axis length of from 3 to 100 nm and a major axis length of from 10 to 2,000 nm and a matrix material, wherein the organic crystal satisfies at least one of the following requirements (1) to (4):
   (1) a surfactant is adsorbed on the organic crystal;
   (2) an inorganic ion is adsorbed on the organic crystal;
   (3) one or more inorganic compounds selected from the group consisting of silicon oxide, titanium oxide, aluminum oxide, zirconium oxide, barium oxide and hydroxyapatite are bonded with the organic crystal; and
   (4) the organic crystal is modified with a group represented by the following formula (1):

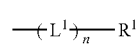     (1)

wherein $L^1$ represents a connecting group represented by any one of the following formulae (2) to (21); n represents an integer of from 0 to 4; when n represents an integer of from 2 to 4, $L^1$s in the number of n may be the same or different; and $R^1$ represents an organic group:

     (2)

     (3)

     (4)

     (5)

     (6)

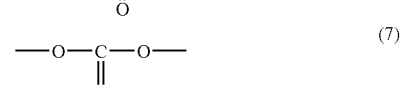     (7)

     (8)

     (9)

     (10)

     (11)

     (12)

     (13)

     (14)

-continued

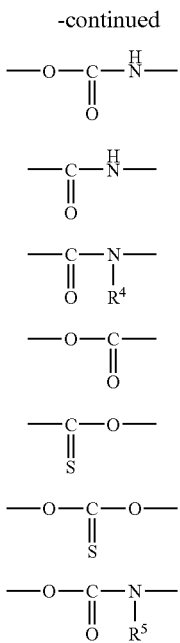

wherein $R^2$ in the formula (11), $R^3$ in the formula (13), $R^4$ in the formula (17) and $R^5$ in the formula (21) each independently represents an organic group.

2. The composition according to claim 1, wherein the surfactant is a cationic surfactant.

3. The composition according to claim 1, wherein the organic crystal is modified with at least one group selected from the group consisting of an alkyl group, an acyl group, an acylamino group, a cyano group, an alkoxy group, an aryl group, an amino group, an aryloxy group and a silyl group.

4. The composition according to claim 1, wherein the organic crystal is an organic polymer crystal.

5. The composition according to claim 1, wherein the organic crystal does not substantially contain a sulfate group.

6. The composition according to claim 1, wherein the organic crystal is crystalline cellulose.

7. The composition according to claim 1, wherein the matrix material is a resin.

8. The composition according to claim 7, wherein the resin is a thermoplastic resin, a solvent-soluble resin or a hardening resin.

9. The composition according to claim 7, wherein the resin is a thermoplastic resin, a solvent-soluble resin or a mixture thereof.

10. The composition according to claim 7, wherein the resin is a hardening resin.

11. The composition according to claim 7, wherein the organic crystal is crystalline cellulose, and the resin is a cellulose based resin.

12. The composition according to claim 7, wherein the organic crystal is crystalline cellulose, and the resin is an aliphatic polyester resin.

13. An article comprising the composition of claim 1.

14. A method for producing an article comprising molding the composition of claim 1 by injection molding, extrusion molding, compression molding, blow molding or powder molding.

15. A film comprising the composition of claim 1.

16. A method for producing a film comprising subjecting the composition of claim 1 to a solution casting film formation method.

17. A method for producing a film comprising subjecting the composition of claim 1 to a solventless film formation method.

18. A method for producing a film comprising subjecting the composition of claim 1 to a melt extrusion film formation method.

19. The method for producing a film according to claim 18, wherein the film formation is carried out by an inflation method.

* * * * *